United States Patent
Hsu et al.

(10) Patent No.: US 8,266,120 B2
(45) Date of Patent: Sep. 11, 2012

(54) METHOD AND APPARATUS FOR USING SELECTIVE ATTRIBUTE ACQUISITION AND CLAUSE EVALUATION FOR POLICY BASED STORAGE MANAGEMENT

(75) Inventors: Windsor Wee Sun Hsu, San Jose, CA (US); Pin Zhou, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 575 days.

(21) Appl. No.: 12/138,351

(22) Filed: Jun. 12, 2008

(65) Prior Publication Data

US 2009/0313297 A1   Dec. 17, 2009

(51) Int. Cl.
*G06F 17/30* (2006.01)
(52) U.S. Cl. ....................................................... 707/694
(58) Field of Classification Search .................. 707/765, 707/694, 812
See application file for complete search history.

(56) References Cited

U.S. PATENT DOCUMENTS

| | | | |
|---|---|---|---|
| 5,276,776 A * | 1/1994 | Grady et al. | 706/48 |
| 6,976,090 B2 * | 12/2005 | Ben-Shaul et al. | 709/246 |
| 7,136,883 B2 * | 11/2006 | Flamma et al. | 1/1 |
| 7,346,844 B1 * | 3/2008 | Baer et al. | 715/708 |
| 7,386,577 B2 * | 6/2008 | Arning et al. | 707/703 |
| 2003/0212687 A1 * | 11/2003 | Gonos | 707/100 |
| 2006/0080353 A1 * | 4/2006 | Miloushev et al. | 707/102 |
| 2006/0259901 A1 | 11/2006 | Kaplan | |
| 2006/0282473 A1 | 12/2006 | Horrocks et al. | |
| 2007/0094316 A1 * | 4/2007 | Rodriguez et al. | 707/205 |
| 2008/0091682 A1 * | 4/2008 | Lim | 707/9 |

* cited by examiner

*Primary Examiner* — Jorge A Casanova
(74) *Attorney, Agent, or Firm* — Kenneth L. Sherman, Esq.; Michael Zarrabian, Esq.; Sherman & Zarrabian LLP

(57) ABSTRACT

The invention provides a method and apparatus for managing stored data objects. The method includes detecting involved attributes of stored data objects based on object management rules, determining expected data storage management costs for each possible order of attribute acquisition for the detected attributes, detecting an order of attribute acquisition that has a data storage management cost which is minimal or below a predetermined threshold, acquiring the attributes of the stored data objects based on the detected order of attribute acquisition, and executing an object management policy based on the acquired attributes to manage the stored objects at the low cost for object storage, attribute acquisition and policy evaluation.

18 Claims, 5 Drawing Sheets

METHOD AND APPARATUS FOR USING SELECTIVE ATTRIBUTE ACQUISITION AND CLAUSE EVALUATION FOR POLICY BASED STORAGE MANAGEMENT

BACKGROUND OF THE INVENTION

1. Field of the Invention

The present invention relates generally to data storage, and in particular to using selective attribute acquisition and clause evaluation for policy based data storage management.

2. Background Information

As the amount of data generated and stored persistently grows exponentially, automatically managing the data (e.g., information lifecycle management, archive and backup, etc.) has become more challenging.

One technique used for an automated data management system is the use of policy-based management. Policy-based data management is based on a set of policies (rules), which comprise conditions and actions. An example of a rule is: if the last access time is older than 30 days (condition), then archive the file (action). Such a management system evaluates the rule condition on managed data objects (i.e., rule evaluation), and then applies the action to these objects on which the condition is satisfied (i.e., rule apply).

Because the rule condition usually compares metadata or content attributes of data objects with certain values, the rule evaluation includes the acquisition (e.g., crawling or mining) of those attributes, as well as the condition evaluation. Due to the instability of many attributes, conventional management systems must acquire attributes and perform evaluations repeatedly on all data objects. This introduces prohibitive overhead when dealing with a large number (e.g., millions) of data objects, especially when the rule uses content attributes, which are usually much more costly and obtained from very expensive mining operations.

SUMMARY OF THE INVENTION

The invention provides a method and apparatus for managing stored data objects. One embodiment involves detecting attributes of a plurality of stored data objects based on a plurality of object management policies/rules, determining expected data storage management costs for each of a plurality of possible orders of attribute acquisition for the detected attributes, detecting an order of attribute acquisition that has a data storage management cost which is minimal or below a predetermined threshold, acquiring the attributes of the plurality of stored data objects based on said detected order of attribute acquisition, and executing an object management policy based on the acquired attributes to manage the plurality of stored data objects at a reduced cost for object storage, attribute acquisition and policy evaluation.

Another embodiment of the invention provides an apparatus for managing object storage. The apparatus comprising: a policy engine module configured to receive clause classification information of the policy from the policy analyzer and receive cached attributes, clause results, change logs and future status for the stored data objects from a database, a policy analyzer module configured to analyze the object management policy to detect involved attributes of the stored data objects and identify acquisition costs and clause failure probabilities required to execute the object management policy and to determine a low cost attribute acquisition order, and an information acquisition module configured to acquire the attributes of the stored data objects from the repository based on the low cost attribute acquisition order. The policy engine module is further configured to execute an object management policy based on the acquired attributes to manage the stored data objects at the low cost for object storage, attribute acquisition and policy evaluation.

Yet another embodiment of the invention provides a computer program product that causes a computer to provide object management rules for stored data objects, detect involved attributes of stored data objects based on object management rules, determine expected data storage management costs for each possible orders of attribute acquisition for the detected attributes, detect an order of attribute acquisition with a low data storage management cost, acquire the attributes of the stored data objects based on the detected order of attribute acquisition, and execute an object management policy based on the acquired attributes to manage the stored data objects at the low cost for object storage, attribute acquisition and policy evaluation.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several preferred embodiments of managing stored data objects, as well as operation and/or component parts thereof. While the following description will be described in terms of backup/archive processes and devices for clarity and to place the invention in context, it should be kept in mind that the teachings herein may have broad application to all types of systems, devices and applications.

The invention provides a method and apparatus for managing stored data objects. One embodiment involves detecting attributes of stored data objects based on object management rules, determining expected data storage management costs, such as file size, storage device costs, read/write delays, bandwidth, system latency, speed, etc., for each possible attribute order of acquisition for the detected attributes, detecting an order of attribute acquisition with a low data storage management cost, acquiring the attributes of the stored data objects based on the detected order of attribute acquisition, and executing an object management policy based on the acquired attributes to manage the stored data objects at the low cost for object storage, attribute acquisition and policy evaluation.

Figure 1:
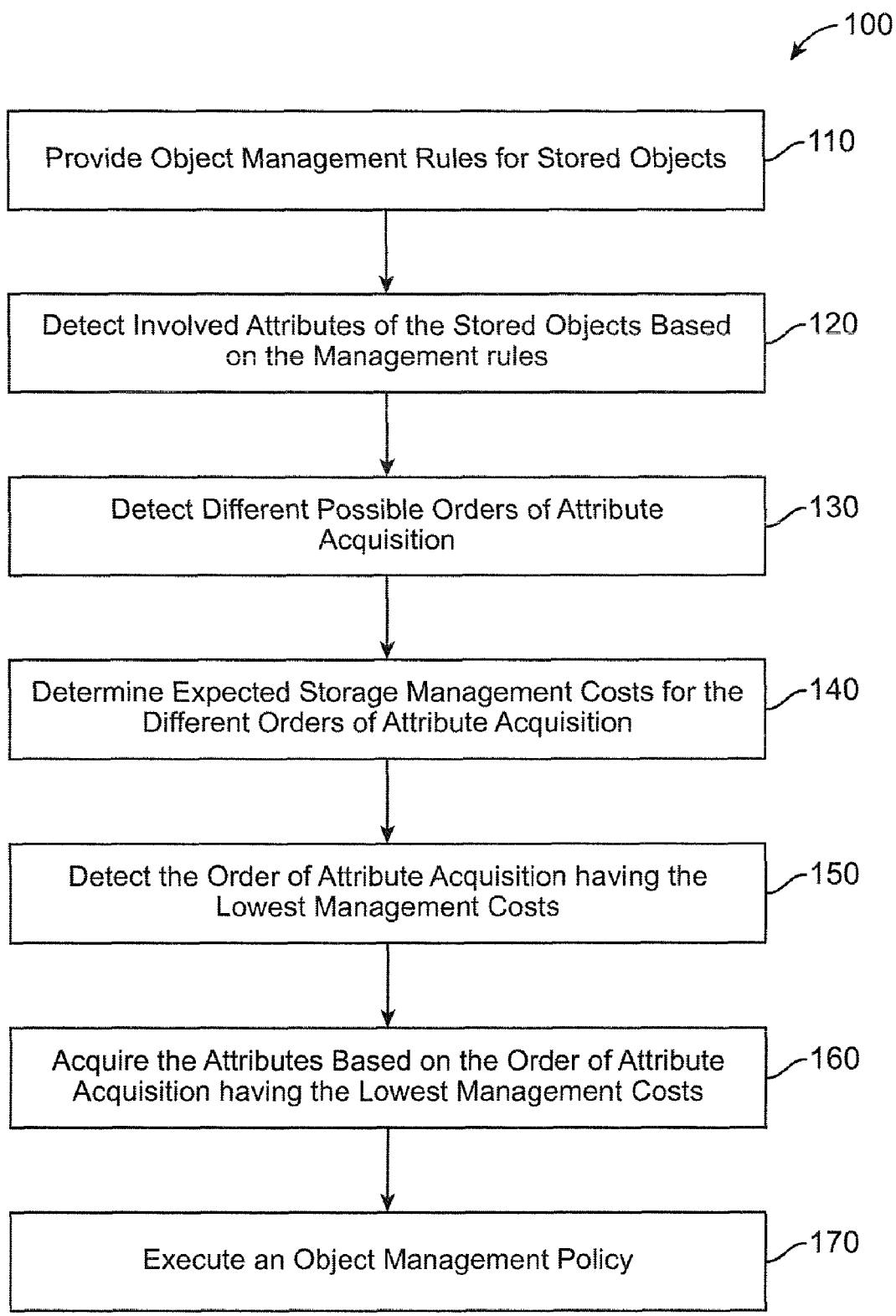
FIG. 1 illustrates a block diagram of a storage management process of one embodiment of the invention.

FIG. 1 illustrates a block diagram of a process 100 for cost effective policy based data storage management, according to an embodiment of the invention. The process 100 begins with block 110 where object management rules for stored data objects are provided. The rules are provided by a system administrator, vendor, operating system, etc. In block 120, attributes of the stored data objects are detected based on the management rules. The attributes include, e.g., metadata of the stored data objects, including creation date, last access time/date, last modified time/date, the content attributes, the data-application association, the access pattern, number of accesses, etc.

The process 100 implements a technique to acquire the attributes that have lower object management cost (which is minimal or lower than a selected threshold) or more likely will determine the result of a policy/rule first, and to stop acquisition as soon as the result is obtained. This is denoted herein as selective attribute acquisition. Another technique implemented by the process 100 includes eliminating unnecessary rule clause evaluations that involve infrequently changed attributes (e.g., metadata) by leveraging certain additional historical information, which is denoted herein as selective clause evaluation.

In the process 100, selective attribute acquisition minimizes the costs for acquiring the attributes of stored data objects used in a rule condition. According to one embodiment of the invention, any rule condition is converted into an equivalent formula that is in conjunctive normal form (CNF), which is a logical conjunction of CNF clauses. In this context, a CNF clause is a disjunction of relational expressions. In one example, a relational expression has the format of operand1 op operand2, where operand1 is an attribute or an arithmetic expression of attributes, op is a relational operator, such as less than, equal to, match, etc., and operand2 is a value. The CNF form of a condition is: $E_1 \cap E_2 \cap \ldots \cap E_n$, where $E_i = e_{i1} \cup e_{i2} \cup \ldots \cup e_{im_i}$ is a CNF clause, and $e_{ij}$ is a relational expression. A simple example of a condition is: $e_1 \cap (e_2 \cup e_3) \cap e_4$, where the first and third clauses contain only a single expression which is denoted herein as simple clauses, and the second clause is a disjunction of two expressions.

In one embodiment of the invention, if any clause of a condition (which is in CNF form) is false, this condition will be false. In another embodiment of the invention, it may not be necessary to acquire every attribute and evaluate every clause. In this embodiment, only the minimal information for finding out the outcome of the condition is acquired. For example, if there is a false clause in the CNF form, only the attributes used in this clause is necessary.

In the block 130, different possible orders of attribute acquisition are detected. In one embodiment of the invention, two factors are used: attribute acquisition costs and rule clause failure possibilities. These factors help determine which attributes should be acquired to produce the final result of a condition as quick (less costly) as possible. Employing the two factors based on the CNF form, one embodiment of the invention determines what information is necessary for acquiring attributes. The same decision is obtained based on the disjunctive normal form (DNF), which is another normal form format (a logical disjunction of DNF clauses, and a DNF clause is a conjunction of relational expressions).

The decision is rule form independent, i.e., the same optimal decision (for the same optimization goal) is obtained using either CNF or DNF, as described below. Assume the order which minimizes the expected cost using a CNF form is orderc, and the order minimizing the expected cost for using a DNF form is orderd. Since the CNF form and DNF form are both equivalent to the rule condition, they use the same set of attributes. Therefore, acquisition order orderc obtained from CNF is also a candidate order for the DNF form, which means $\exp(Corder_d) \leqq \exp(Corder_c)$ because $order_d$ minimizes the cost for the DNF form and its cost is no greater than the cost of any candidate order. Similarly, acquisition order $order_d$ obtained from DNF is also a candidate order for the CNF form, and thus, resulting in $\exp(Corder_c) \leqq \exp(Corder_d)$. Based on said expressions, then $\exp(Corder_c) = \exp(Corder_d)$, indicating that the acquisition orders obtained from CNF and DNF have the same minimal cost, therefore, the solution is independent on the form of the rule.

In the process 100, management costs are considered along with attribute acquisition costs. A storage management policy/rule condition usually involves different attributes with different acquisition costs. For example, acquiring attributes stored in the user space (e.g., a database) is usually less costly than acquiring metadata attributes through file system calls, whereas acquiring file system metadata attributes is usually less costly than getting content attributes through data mining. The acquisition costs can be specified based on e.g., experience, user inputs, or statistics. If only the acquisition cost is considered, intuitively the less costly attributes should be acquired and corresponding clauses should be evaluated first. This is because the failure of these less costly clauses could save the acquisition and evaluation costs for the more costly attributes.

The acquisition costs of certain attributes can also be correlated. For example, performing a stat( ) file system call (i.e., a system call that returns useful data about a file) on a file results in identification of all file system metadata attributes of this file. Therefore, at the cost (bandwidth, delay, latency, etc.) of a system call, a set of metadata attributes can be obtained. Acquiring only one metadata attribute for a file at a time (i.e., multiple system calls) is more costly than acquiring multiple metadata attributes at a time, which only adds negligible additional costs. For the attributes sharing the cost or having the correlated cost, they are acquired together.

In the block 140, the expected storage management costs are obtained for different orders of attribute acquisition. The clauses in a rule condition have different roles in producing the final outcome of the condition, because they have different probabilities to be false (called failure probabilities). Similarly, the importance of the expressions in a clause is different due to their different failure probabilities. This implies that a specific clause evaluation order and expression evaluation order based on failure probabilities can lead to the outcome by acquiring the minimal number of attributes and evaluating the minimal number of clauses and expressions. In one example, the clauses with higher failure probabilities are evaluated earlier than those with lesser failure probabilities. In another example, the expressions with lesser failure probabilities are evaluated even earlier, because these evaluations have higher potential to filter out unnecessary clauses or expressions, and thus, the rule evaluation results are obtained faster and with less attribute acquisition and clause or expression evaluation efforts.

In one embodiment of the invention, the failure probability of a rule clause is calculated based on the failure probabilities of its expressions. At the start of one embodiment of the invention, in the process 100 the failure probabilities of rule expressions can be specified based on heuristics or user inputs due to the lack of actual evaluation information. Failure probabilities can then be continuously refined based on the statistics of the actual evaluation results.

In one example, both acquisition costs and failure probabilities are combined to provide guidance on the acquisition and evaluation order from different points of view. In order to combine these two factors together to gain an integrated guidance considering both aspects, in the block 140 the expected cost for determining the attribute acquisition order (as well as the evaluation order) is determined.

In one embodiment of the invention, the expected cost is defined using the two factors. For the rule condition example $e_1 \cap (e_2 \cup e_3) \cap e_4$, the attribute acquisition costs for expressions e1, e2, e3 and e4 are denoted herein as c1, c2, c3 and c4, respectively, and the failure probabilities for e1, e2, e3 and e4 are denoted herein as p1, p2, p3 and p4, respectively. If the acquisition (or evaluation) order is e1→e2→e3→e4, then the expected cost for this order is: $\exp(C_{(1;2;3;4)})$=c1+(1−p1)*(c2+p2*c3)+(1−p1)*(1−p2*p3)*c4 according to an embodiment of the invention. The expected cost depends on the acquisition order, more generally, for a general condition of $E_1 \cap E_2 \cap \ldots \cap E_n$, where $E_i = e_{i1} \cup e_{i2} \cup \ldots \cup e_{im_i}$, if the acquisition or evaluation order of clauses is E1→E2→...En, and for each $E_i$, the order of expressions is $e_{i1} \rightarrow e_{i2} \rightarrow \ldots \rightarrow e_{im_i}$, then the expected cost for this order order1 is expressed as:

$$\exp(Corder1) = C1 + (1-P_1)*C2 + (1-P_1)*(1-P_2)*C3 + \cdots + (1-P_1)*\cdots*(1-P_{n-1})*Cn$$

$$= \sum_{i=1}^{n} \left( \prod_{j=0}^{i-1} (1-p_j) \right) * C_i,$$

$$P_0 = 0,$$

where Ci is the acquisition cost of the clause Ei, which is related to the expression retrieval order of Ei, and Pi is the failure probability of Ei, which can be calculated using the expression for failure probabilities of Ei:

$$C_i = c_{i1} + p_{i1}*c_{i2} + p_{i1}*p_{i2}*c_{i3} + \cdots + p_{i1}*\cdots*p_{i(m_i-1)}*c_{im_i}$$

$$= \sum_{k=1}^{im_i} \left( \prod_{i=0}^{i(m_i-1)} (p_i) \right) * C_{ki},$$

$$p_{i0} = 1,$$

$$P_i = p_{i1} * p_{i2} * \cdots * p_{im_i}$$

$$= \prod_{k=1}^{im_i} p_k$$

where $c_i k$ and $p_i k$ are the attribute acquisition cost and failure probability of the kth expression in the clause Ei, respectively. Therefore, the expected cost for this acquisition order becomes:

$$\exp(C_{order1}) = \sum_{i=1}^{n} \left( \prod_{j=0}^{i-1} \left( 1 - \prod_{k=1}^{im_i} p_k \right) \right) * \left( \sum_{k=1}^{im_i} \left( \prod_{i=0}^{i(m_i-1)} p_i \right) * c_k \right),$$

$$p_{i0} = 1$$

If the DNF form is used, the formula for the expected cost is similar to the form for CNF. The only difference is that in the formula for DNF, the probabilities should be the success probabilities instead of the failure probabilities.

In the block 150, an acquisition order to minimize the expected cost is detected according to an embodiment of the invention. The attribute is acquired by following the order and the clause and expression evaluation is performed until a false clause is reached. To decide a possible order candidate, the expressions in a clause are evaluated one after another without interruption of other clause evaluations until this clause's result is obtained. This filters out many impossible permutations of all expressions. According to one embodiment of the invention, a brute force way of finding the minimal cost is to try all possible acquisition orders as there are usually a small number of clauses and expressions in a condition, and the number of possible orders are not large.

In one embodiment of the invention, certain possible acquisition orders are trimmed and the search space is reduced by examining the costs and probabilities. For example, the clauses with both high costs and low failure probabilities should not be placed in front of other clauses. In one example, the exact minimal cost acquisition order is not necessary, and an acquisition order with a cost close to the minimal cost is detected. In this example, the close to minimal acquisition order allows to further reduce the search space using some heuristics. One implementation considers that if the attributes are separated into different groups, which have large gaps (e.g., orders of magnitude difference) in term of acquisition costs, the attributes in the high-cost group are acquired after other attributes in lower-cost groups.

In another embodiment of the invention, the acquisition order is further optimized by recording the effective clause of a false rule condition. The effective clause is the first clause with the false result. Our policy evaluation stops when the first false clause is reached, which is the effective clause. The effective clause only relates to false conditions, not true conditions. For a condition with the effective clause, in one embodiment of the invention, the effective clause is evaluated first, and the expected cost is used to determine the order for the remaining clauses. The effective clause can remain effective because of the usage pattern and the attributes of a data object remain similar for a short period.

The detected acquisition order in block 150 provides the guidance for not only the on-the-fly attribute acquisition and evaluation, but also background attribute acquisition (i.e., attributes are not acquired for immediate evaluation, but for future evaluation) under some resource constraint according to an embodiment of the invention. For example, if the available resource does not allow acquiring all attributes, only part of the attributes are acquired based on the detected acquisition order, to satisfy the constraint and also obtain the most useful attributes.

In one embodiment of the invention, the acquisition costs and failure probabilities are grouped based on different granularities. The finest is the single object or file granularity, and the coarsest is to assign the same costs and probabilities for all objects or files. Within a range, the finer the granularity is, the more accurate the expected cost is, the closer to optimal the chosen acquisition order is, and the smaller the acquisition and evaluation cost is. Beyond this range, however, the statistics are less meaningful at too fine of a granularity, therefore, the calculated acquisition order can become less optimal and lead to a larger overhead. The finer the granularity is, the larger the overhead for calculating the acquisition orders is, because more calculations are needed for more different values. Therefore, in one embodiment of the invention a granularity is selected that provides reasonably good accuracy without being too fine.

For metadata attributes, depending on the place of storage, such as the user space (e.g., a database), or the file system, the acquisition costs from the same place should be similar across all objects. For content attributes, however, the acquisition costs could largely depend on the size of the objects because of mining of the content, and different costs are assigned based on object size according to one embodiment of the invention. In this embodiment the failure probabilities are more directory-dependent because the objects in the same directory tend to have similar access patterns, belong to a similar category and have related content. In one embodiment of the invention before any probabilities are known, all objects from the root directory are treated the same unless more detailed information based on heuristics or user inputs is obtained. After history is obtained, as the process 100 is carried out, the statistics are gradually collected based on the real evaluation results according to an embodiment of the invention. During process 100, the statistic information is collected in a bottom-up manner, and if found at some level, the difference of the statistics of the child branches is larger than some threshold, the children will be separated into different groups with different statistics (failure probabilities).

Figure 2:
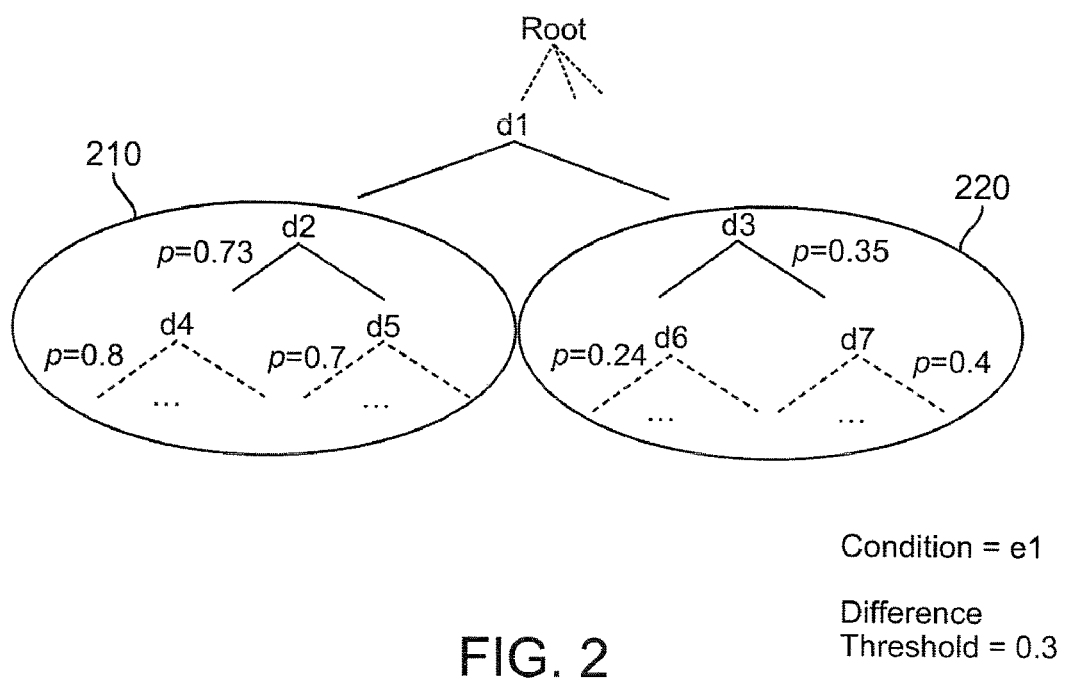
FIG. 2 illustrates an exemplar graphical illustration showing failure probability granularity determination for an embodiment of the invention.

FIG. 2 illustrates an example of determining failure probability granularity. In the example, the condition is a single simple clause and the threshold for statistics difference is set to 0.3. From bottom-up, the statistic failure probability is obtained for each directory as shown in FIG. 2. The probabilities of d2 210 and d3 220 have the difference of 0.38, which is larger than the threshold 0.3, therefore, the sub-tree of d2 210 and the sub-tree of d3 220 become two different groups with different failure probabilities assigned, 0.73 and 0.35, respectively.

For stable attributes, its change log is maintained to track the attribute changes according to an embodiment of the invention.

In block 160, the attributes are acquired based on the order of attribute acquisition having low costs (e.g., the lowest costs, close to the lowest costs, etc.). In block 170, the object management policy/rules are executed at the low cost for object storage, attribute acquisition and policy evaluation.

In another embodiment of the invention, in addition to using the expected cost for selective attribute acquisition, the acquisition and evaluation is optimized by leveraging the fact that some attributes never change or rarely change. In this embodiment of the invention, the detected order of attribute acquisition is adjusted with selective rule clause evaluations of the detected attributes and the attributes of the stored data objects are acquired based on the adjusted order of attribute acquisition. These selected attributes may not need to be repeatedly acquired and the corresponding clauses do not have to be repeatedly evaluated. For ease of discussion, the following optimization example is based on a simple clause, which only consists of a single expression. The extension to the general clause is similar, but more complex.

In this embodiment of the invention, this optimization requires classifying a clause based on its attribute and value. The attribute can be classified as constant, stable or dynamic according to an embodiment of the invention. Constant attributes (e.g., the file creation time) will never change. Stable attributes change infrequently, for example, the file user ID and group ID fall into this category. Dynamic attributes keep changing, such as the last access time. Most attributes belong to stable or dynamic.

The value can be classified either constant or variable according to an embodiment of the invention. The variable value changes over time, and can be converted into a specific value based on the current time. An example of the variable value is "30 days ago," which represents a specific day corresponding to the current day. In one embodiment of the invention there are six types of clauses based on different combinations of attributes and values. Table 1 summarizes the optimizations for different clause types and the additional information required by these optimizations, according to an embodiment of the invention.

TABLE 1

| | | Attribute | | | | |
|---|---|---|---|---|---|---|
| | | Constant | | Stable | | Dynamic |
| | | Extra Info. | Action | Extra Info. | Action | Extra Info. | Action |
| VALUE | Constant | Clause Result | Case 1:<br>True Result:<br>Ignore this clause<br>False Result:<br>no evaluation | Clause result<br>Change log | Case 2:<br>Attr. Unchanged:<br>same as case 1<br>Attr. Changed:<br>no optimization | N/A | N/A |
| | Variable | Clause Result<br>Future status | Case 3:<br>Status unchanged:<br>same as case 1<br>Status changed:<br>No optimization | Clause result<br>Change log<br>Future status | Case 4:<br>Both unchanged:<br>same as case 1<br>Either changed:<br>no optimization | N/A | N/A |

In another embodiment of the invention, multiple rules use the same attributes, which is a common practice. If the shared attribute does not change frequently, it can be acquired only once and used for multiple rules. These shared static attributes (including the never changed constant attributes and the rarely changed stable attributes) are detected, and then cached into some place (e.g., a database) to save the acquisition costs.

In one embodiment of the invention, for Case 1: for a rule clause with a constant attribute and constant value, its evaluation result never changes, therefore the result is stored for future use. If its result obtained is true, this clause is ignored and the expected cost technique is applied to the remaining clauses, otherwise, the result of the rule will be false since the rule is a logical conjunction of clauses.

In one embodiment of the invention, for Case 2: for a clause with a stable attribute and constant value, the attribute could change, although not often. The changes of the stable attribute are captured, such as building a change log for this attribute of all objects. For the objects with the unchanged attributes, it is handled the same as with case 1. For the changed attribute, the clause is re-evaluated together with other clauses in the rule using expected cost. In one embodiment of the invention, the future status is to be determined and stored for clauses with variable values and constant (or stable) attributes. The future status discloses if the result could potentially change or not in the next evaluation. In one embodiment of the invention, the determination for future status is performed at every evaluation, assuming it is known when the next evaluation will occur, which is usually true. In this embodiment, the following process is performed:

1. Obtain the specific value of the variable value based on next evaluation time.
2. For a clause with a constant attribute and variable value, simply determine the next evaluation result to determine the future status.
3. For a clause with a stable attribute and variable value, assuming the attribute will not change, it is treated the same as constant. The reason this is done is because even if this attribute of some objects change later, the changes will be captured by the change log, and the clause will be re-evaluated for these changed objects regardless the future status.

Accordingly, the future status is leveraged for the following two cases. Case 3: for a clause with a constant attribute and variable value, the future status is treated similarly to the change status, as in case 2. If the future status of the objects is "unchanged," the rule evaluation on these objects is the same as case 1. For the objects with future status "changed," the clause is re-evaluated with other clauses based on expected cost.

Case 4: for a clause with a stable attribute and variable value, the change log and the future status is inspected. For the objects having both "unchanged," the rule evaluation is the same as case 1. For the objects with either one "changed," re-evaluate this clause as well as others.

Figure 3:
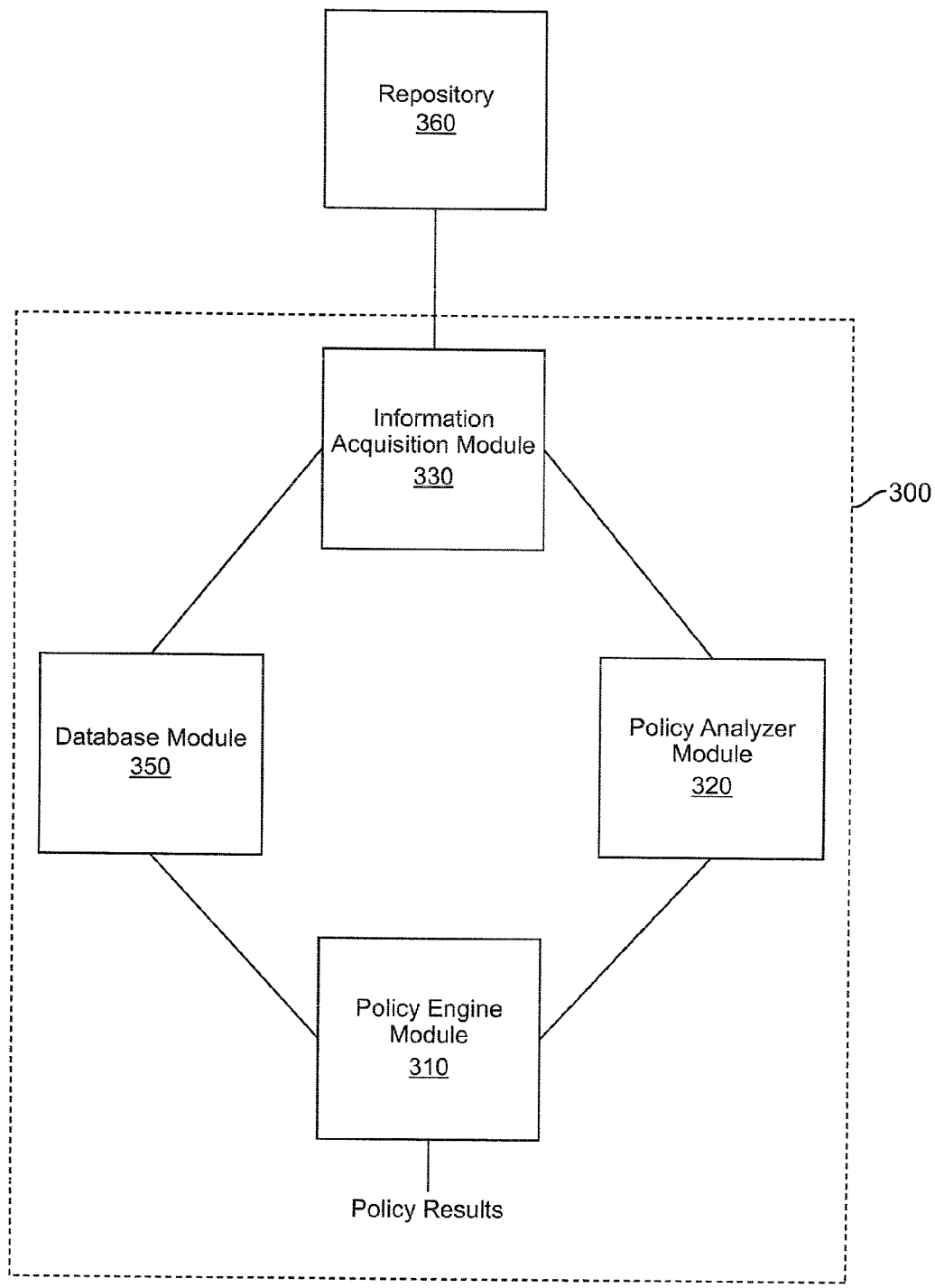
FIG. 3 illustrates a block diagram of a storage management device of an embodiment of the invention.

FIG. 3 illustrates a block diagram of a storage management device 300 according to an embodiment of the invention. In one embodiment, the storage management device 300 includes a policy engine module 310, a policy analyzer module 320, and an information acquisition module 330. In one embodiment, storage management device 300 includes a storage device 350, such as a database. As illustrated, storage management device 300 is connected to a repository 360. In one embodiment of the invention, storage management device 300 incorporates all the functionality of process 100.

In one embodiment of the invention the policy analyzer module 320 is configured to analyze the object management policy to detect involved attributes of the stored data objects and identify acquisition costs and clause failure probabilities required to execute the object management policy and to determine a low cost attribute acquisition order. In one embodiment, the policy engine module 310 is configured to receive cached attributes, clause results, change logs and future status for the stored data objects from storage device 350. The policy analyzer module 320 also parses the rules, classifies the rule clauses based on attributes and values, and feeds the clause classification results into the policy engine module 310.

The policy analyzer module 320 also obtains the acquisition costs and initial failure probabilities from system default configuration or user inputs, and uses them to selectively acquire important attributes and perform partial evaluation.

To reduce the acquisition costs, in one embodiment of the invention the constant and stable attributes are stored, e.g., in storage device 350. To reduce the policy evaluation costs and the attribute acquisition costs by using the clause classification generated by the policy analyzer module, in one embodiment of the invention, the results, the change log and the future status for clauses are stored in storage device 350.

Figure 4:
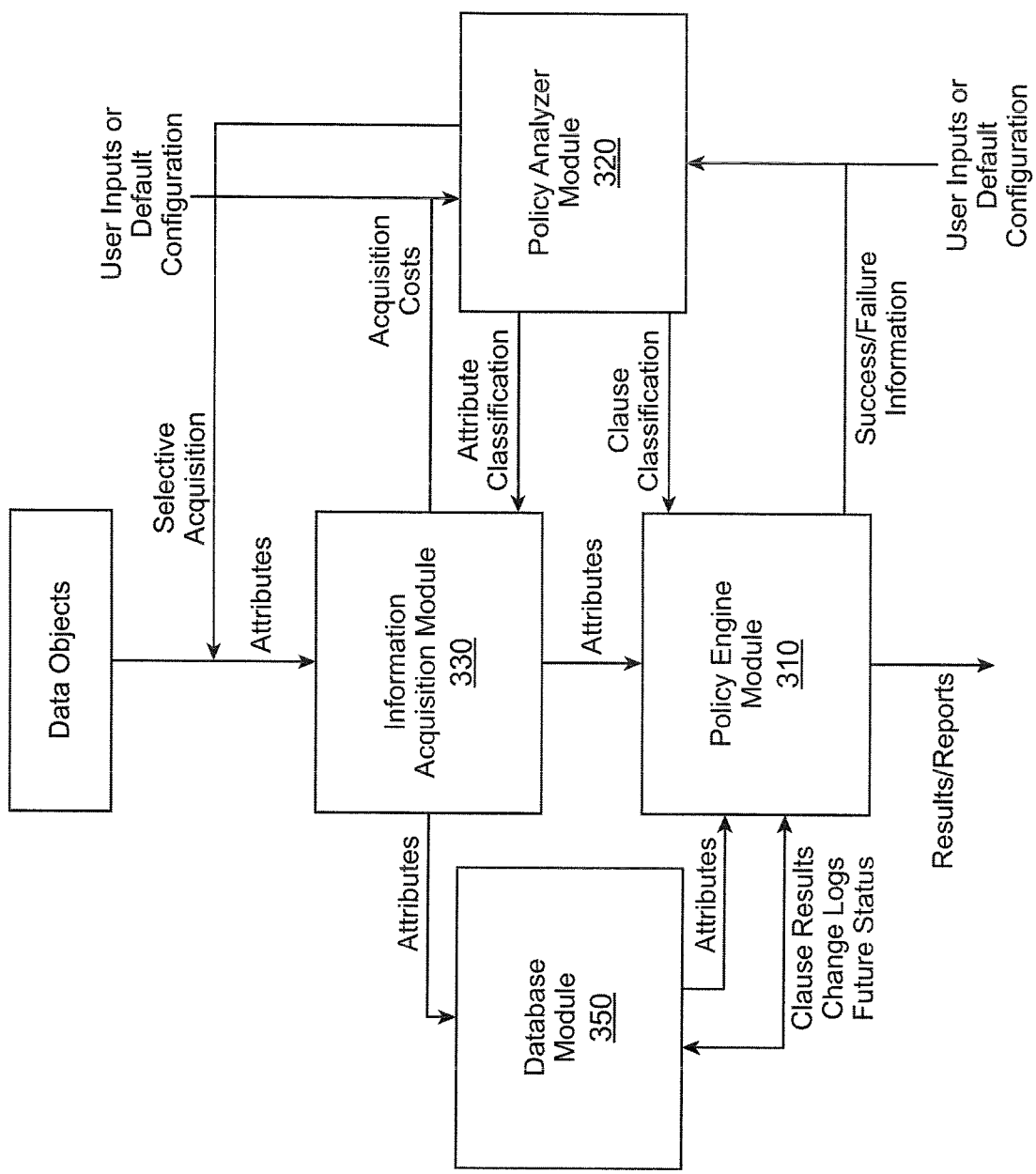
FIG. 4 illustrates an information flow diagram of the storage management device illustrated in FIG. 3.

In one embodiment the information acquisition module 330 is configured to acquire the attributes of the stored data objects from the repository 360 based on a low cost attribute acquisition order, and the acquisition costs are feed back to the policy analyzer module 320 and used for acquisition cost statistics. The policy engine module 310 is further configured to execute an object management policy based on the acquired attributes to manage the stored data objects at the low cost for object storage and object acquisition, and the evaluation/execution results are feed back to the policy analyzer module 320 and used for failure probability statistics. FIG. 4 illustrates an information flow diagram of the storage management device illustrated in FIG. 3.

Figure 5:
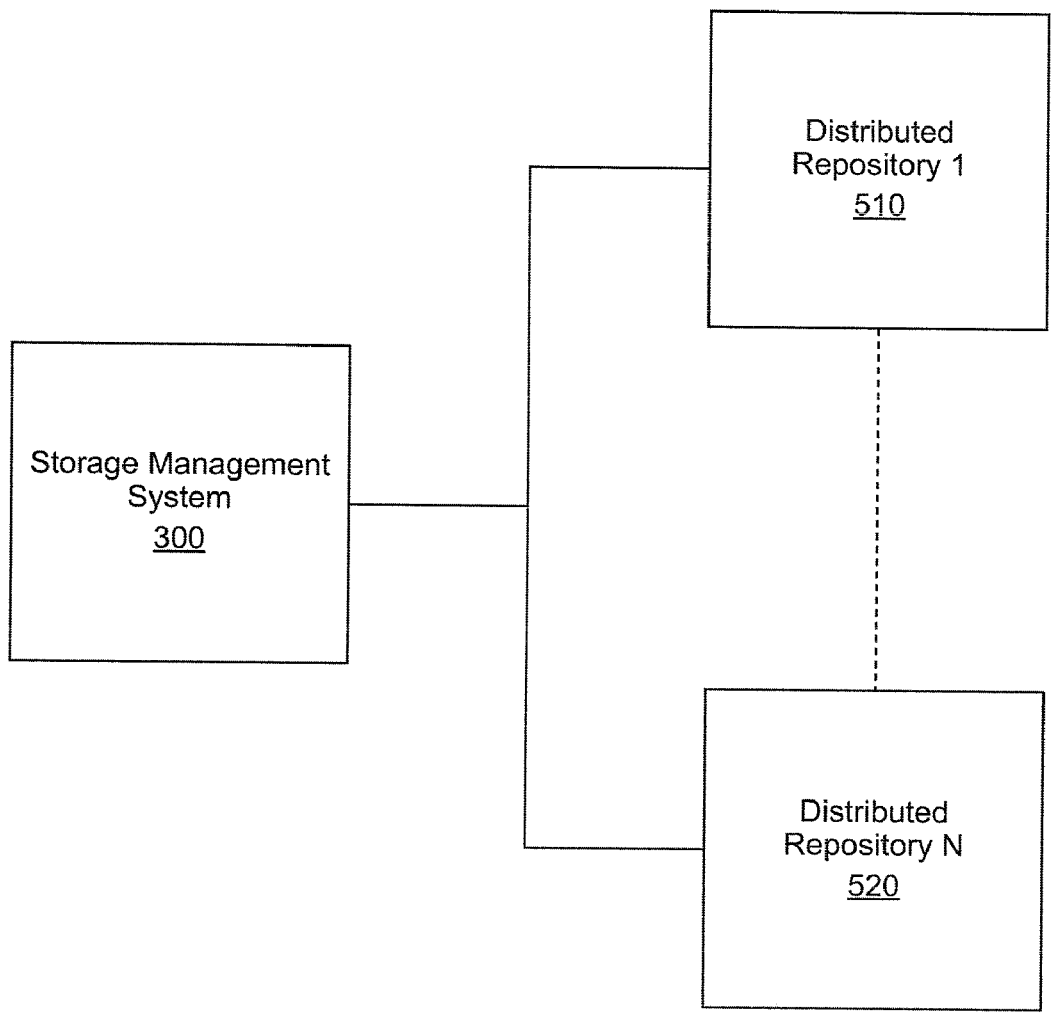
FIG. 5 illustrates a distributed network including a storage management system, according to an embodiment of the invention.

FIG. 5 illustrates an embodiment of the invention with storage management device 300 coupled to distributed repository 1 510 to distributed repository N 520, where N is a positive integer. In this embodiment of the invention, storage management device 300 manages objects stored in distributed repository 1 510 through distributed repository N 520 over a network, such as a Local Area Network (LAN), Wide Area Network (WAN), Internet, etc. The distributed repositories 1 510 through N 520 communicate over the network either wirelessly or wired directly to the network. In one embodiment, only selected distributed repositories are managed.

The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device.

The medium can be electronic, magnetic, optical, or a semiconductor system (or apparatus or device). Examples of a computer-readable medium include, but are not limited to, a semiconductor or solid state memory, magnetic tape, a removable computer diskette, a RAM, a read-only memory (ROM), a rigid magnetic disk, an optical disk, etc. Current examples of optical disks include compact disk-read only memory (CD-ROM), compact disk-read/write (CD-R/W) and DVD.

I/O devices (including but not limited to keyboards, displays, pointing devices, etc.) can be connected to the system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters.

Some embodiments of the invention include two techniques. The first technique of these embodiments, selective attribute acquisition, acquires the attributes that have a lower cost, or will determine the result of a rule first, and stops acquisition as soon as the result comes out. The second technique of these embodiments, selective clause evaluation, eliminates unnecessary evaluations that involve infrequently changed attributes by leveraging some extra information.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method of managing stored data objects, comprising:
   detecting involved attributes of a plurality of stored data objects based on a plurality of object management rules;
   acquiring the necessary attributes for producing the policy evaluation result with low cost based on selective attribute acquisition and elimination of rule clause evaluations involving attributes determined to have infrequent changes based on historical information, wherein selective attribute acquisition comprises determining expected data storage management costs for each of a plurality of possible orders of attribute acquisition for the detected attributes based on associated attribute acquisition cost for each attribute, and the determined expected data storage management costs is defined based on attribute acquisition costs and failure probabilities, wherein the failure probabilities are continuously refined based on statistics of evaluation results of actual attribute acquisition costs and failures of rule expressions; and
   executing an object management policy based on analyzing acquisition order of the acquired attributes to manage the plurality of stored data objects at reduced cost for object storage, attribute acquisition and policy evaluation, wherein each attribute is associated with an acquisition cost value.

2. The method of claim 1, wherein selective attribute acquisition further comprises:
   detecting an order of attribute acquisition that has a data storage management cost below a predetermined threshold; and
   acquiring the attributes of the plurality of stored data objects based on said detected order of attribute acquisition.

3. The method of claim 2, further comprising:
   adjusting said detected order of attribute acquisition with effective clause information and selective rule clause evaluations of the detected attributes; and
   acquiring the attributes of the plurality of stored data objects based on the adjusted order of attribute acquisition.

4. The method of claim 3, wherein selective rule clause evaluations are based on classifying clauses based on attribute stability and attribute value state.

5. The method of claim 2, further comprising reducing the plurality of possible orders of attribute acquisition based on the heuristics.

6. The method of claim 1, further comprising:
   transforming each rule into a conjunctive normal form; and
   analyzing the transformed rules to determine required attribute acquisition costs and failure probabilities and determine a plurality of possible order of attribute acquisition based on the detected attributes.

7. The method of claim 6, wherein the required attribute acquisition costs and rule failure probabilities are obtained from system default configuration or user inputs, or dynamically determined based on evaluation history.

8. The method of claim 1, further comprising:
   identifying shared attributes of a plurality of objects used by the plurality of object management rules;
   classifying shared attributes based on their change frequencies; and
   storing the never or rarely changed shared attributes for single acquisition and use of the shared attributes for the plurality of object management rules for reduced acquisition cost.

9. An apparatus for managing object storage, comprising:
   a processing hardware device coupled with:
      a policy engine module configured for receiving a plurality of cached attributes, clause results, change logs and future status for the plurality of stored data objects from a database for producing a policy evaluation result with low cost based on selective attribute acquisition and elimination of rule clause evaluations involving attributes determined to have infrequent changes based on historical information;
      a policy analyzer module configured for analyzing the object management policy for detecting involved attributes of the plurality of stored data objects, for identifying acquisition costs and clause failure probabilities required to execute the object management policy and for determining attribute acquisition order that has a data storage management cost which is minimal or below a predetermined threshold; and
      an information acquisition module configured to acquire the attributes of the plurality of stored data objects from the repository based on the low cost attribute acquisition order,
   wherein the policy engine module is further configured for executing an object management policy based on analysis of acquisition order for the acquired attributes for managing the plurality of stored data objects at the low cost for object storage, attribute acquisition and policy evaluation, wherein each attribute is associated with an acquisition cost value, and wherein selective attribute acquisition comprises determining expected data storage management costs for each of a plurality of possible orders of attribute acquisition for the detected attributes based on associated attribute acquisition cost for each attribute, and the determined expected data storage management costs is defined based on attribute acquisition costs and failure probabilities, wherein the failure probabilities are continuously refined based on statistics of evaluation results of actual attribute acquisition costs and failures of rule expressions.

10. The apparatus of claim 9, wherein the policy analyzer module is further configured for:
classifying clauses based on its attribute and value state; and
sending the clause classification information to the policy engine module for storing clause results and/or change logs and/or future status in a database based on clause classifications.

11. The apparatus of claim 9, wherein the policy analyzer module is further configured for:
identifying shared attributes of a plurality of objects used by the plurality of object management rules;
classifying shared attributes based on their change frequencies; and
sending the shared attribute classification information to the information acquisition module for storing constant and stable shared attributes in a database for single acquisition and use of the shared attributes for the plurality of object management rules for reduced acquisition cost.

12. A computer program product for managing stored data objects comprising a non-transitory computer usable medium including a computer readable program, wherein the computer readable program when executed on a computer causes the computer to:
detect involved attributes of a plurality of stored data objects based on a plurality of object management rules;
acquire the necessary attributes for producing the policy evaluation result with low cost based on selective attribute acquisition and elimination of rule clause evaluations involving attributes determined to have infrequent changes based on historical information;
determine expected data storage management costs for each of a plurality of possible orders of attribute acquisition for the detected attributes, wherein the determined expected data storage management costs is defined based on attribute acquisition costs and failure probabilities; and
execute an object management policy based on analyzing acquisition order of the acquired attributes to manage the plurality of stored data objects at reduced cost for object storage, attribute acquisition and policy evaluation, wherein each attribute is associated with an acquisition cost value.

13. The computer program product of claim 12, wherein the computer readable program when executed on the computer further causes the computer to:
detect an order of attribute acquisition that has a data storage management cost below a predetermined threshold; and
acquire the attributes of the plurality of stored data objects based on said detected order of attribute acquisition.

14. The computer program product of claim 13, wherein the computer readable program when executed on the computer further causes the computer to:
adjust said detected order of attribute acquisition with effective clause information and selective rule clause evaluations of the detected attributes; and
acquire the attributes of the plurality of stored data objects based on the adjusted order of attribute acquisition.

15. The computer program product of claim 13, wherein the computer readable program when executed on the computer further causes the computer to reduce the plurality of possible orders of attribute acquisition based on the heuristics.

16. The computer program product of claim 12, wherein the computer readable program when executed on the computer further causes the computer to:
transform each rule into a conjunctive normal form; and
analyze the transformed rules to determine required attribute acquisition costs and failure probabilities and determine a plurality of possible order of attribute acquisition based on the detected attributes.

17. The computer program product of claim 16, wherein the required attribute acquisition costs and rule failure probabilities are obtained from system default configuration or user inputs, or dynamically determined based on evaluation history.

18. The computer program product of claim 12, wherein the computer readable program when executed on the computer further causes the computer to:
identify shared attributes of a plurality of objects used by the plurality of object management rules;
classify shared attributes based on their change frequencies; and
store the never or rarely changed shared attributes for single acquisition and use-of the shared attributes for the plurality of object management rules for reduced acquisition cost.

* * * * *